2,850,424

ADHESIVE PROCESS

Anthony F. Finelli, Akron, and Harlan M. Rice, Brecksville, Ohio, assignors to The Goodyear Tire & Rubber Company, Akron, Ohio, a corporation of Ohio No Drawing. Application February 1, 1956
Serial No. 562,646

6 Claims. (Cl. 154—130)

This invention relates to the adhesion of elastomeric materials to metal. More specifically, it relates to processes for adhering metals to elastomeric materials formed from the reaction of a polyisocyanate and an active-hydrogen-containing polymeric material.

The production of elastomeric materials from the reaction of a polyisocyanate and an active-hydrogen-containing polymeric material is a relatively new development. These polymeric materials are either liquid at room temperature or capable of being melted at relatively low temperatures. The polyisocyanate reacts with the active-hydrogen atoms in the polymeric material forming a network of chain-extended, cross-linked units which, after cure, form a solid or, in some instances, a cellular elastomeric material.

Examples of the active-hydrogen-containing polymeric materials useful in the practice of this invention are polyesters, polyesteramides, polyalkylene ether glycols, and mixtures of two or more of these. By the term "active-hydrogen" used to describe these polymeric materials is meant those hydrogen atoms which are reactive as measured and determined by the Zerewitinoff method. The polyesters are prepared by the condensation reaction between one or more glycols and one or more dibasic carboxylic acids. The polyesteramides are prepared from one or more glycols, one or more dibasic carboxylic acids and relatively small amounts of one or more bifunctional amino-bearing compounds such as amino carboxylic acids, amino alcohols, or diamines. Small amounts of trifunctional materials may optionally be employed in preparing the active-hydrogen-containing polyesters and polyesteramides. The polyalkylene ether glycols are hydroxyl-terminated polyethers derived from alkylene oxides or glycols or from heterocyclic ethers such as dioxolane. Further examples of these active-hydrogen-containing polymeric materials and methods for their preparation are described in United States Patents 2,625,-531; 2,625,532; and 2,625,535 which show polyesters and polyesteramides and United States Patents 2,692,873 and 2,702,797 which show the polyalkylene ether glycols. Preferred active-hydrogen-containing polymeric materials useful in the practice of this invention are the polyesters, polyesteramides and polyethers having an average molecular weight of from approximately 1,000 to 5,000, and, in the case of polyesters and polyesteramides, an acid number not greater than 5. In this molecular weight range, these polymers have a hydroxyl number from approximately 20 to 110. Best results are obtained with polyesters having an acid number not greater than 2, a hydroxyl number of approximately 60, and an average molecular weight of approximately 2,000.

The amount of organic polyisocyanates or mixtures of polyisocyanates employed in preparing the elastomers should be at least sufficient to cross-link the active-hydrogen-containing polymeric material as well as to extend the molecular chain. An excess of isocyanate is required for this purpose. The amount of this excess can vary up to 200% or higher. Representative examples of polyisocyanates which may be employed are the diisocyanates such as hexamethylene diisocyanate; paraphenylene diisocyanate; meta-phenylene diisocyanate; 4,4'-diphenylene diisocyanate; 1,5-naphthalene diisocyanate; 4,4'-diphenylene methane diisocyanate; the tolylene diisocyanates; 4,4'-diphenyl ether diisocyanate; 3,3'-dimethyl 4,4'-diphenyl diisocyanate; and 3,3'-dimethoxy 4,4'-diphenyl diisocyanate; the triisocyanates such as 4,4',4''-triphenyl methane triisocyanate; and toluene 2,4,6 triisocyanate; the tetraisocyanates such as 4,4'-dimethyl-diphenyl methane 2,2',5,5' tetraisocyanate and mixtures of polyisocyanates such as those described in U. S. Patent 2,683,730. Of these 1,5-naphthalene diisocyanate; 4,4'-diphenylene methane diisocyanate; 4,4'-diphenylene diisocyanate; 3,3'-dimethyl 4,4'-diphenyl diisocyanate; 3,3'-dimethoxy 4,4'-diphenyl diisocyanate and the liquid tolylene diisocyanates such as 2,4-tolylene diisocyanate and 2,6 tolylene diisocyanate, or mixtures of these, are preferred.

Where known adhesive systems were used to bond these new elastomers to metal, it was observed that the adhesion was rather poor. That is to say, the bond between the elastomer and the metal could be broken with relative ease.

It is, therefore, the broad object of this invention to provide a method by which the adhesion between these new elastomers and metal may be greatly increased. Another object is to improve the adhesion between these elastomers and metal at elevated temperatures. Another object is to provide a method whereby the field of use for such elastomeric materials may be broadened by utilizing these new elastomers in applications where elastomers in conjunction with a metal base are required. Still another object is to improve the quality of adhesion whereby the effort required to fabricate useful products of commerce is minimized. Other objects will appear as the description proceeds.

The objects of this invention are accomplished by (1) coating the metal base with a cement containing from 70 to 30 parts by weight of a resin formed by polymerizing styrene with acrylonitrile and from 30 to 70 parts by weight of a mixture of polyisocyanates, defined by the formula:

$$OCN—R—(CY_2—R'—NCO)_n$$

in which R and R' are arylene radicals, Y is selected from the group consisting of hydrogen, alkyl and aryl radicals, and n is a whole number, containing a maximum of 40% by weight of the diisocyanate and a minimum of 60% by weight of polyisocyanates and containing more than 2 isocyanate equivalents per mol, (2) curing the coating of cement to the metal, (3) applying a second coat of cement containing 1 part by weight of a resin formed by polymerizing styrene with acrylonitrile and from 8 to 20 parts by weight of a reaction product formed from approximately 1 mol of a polyol of average molecular weight of about 400 and not more than 2 mols of a diisocyanate, (4) curing the second coat of cement, (5) applying the active-hydrogen-containing polymeric material/polyisocyanate mixture to the cement coated metal base and (6) curing the active-hydrogen-containing polymeric material/polyisocyanate mixture to form an elastomeric coated metal.

This invention is applicable to adhering these polymer/polyisocyanate mixtures to metals such as aluminum, steel, brass, zinc plate, stainless steel, and other alloys. It is desirable that the metal base to which the cements are applied be cleaned and dried. This can be accomplished by the use of solvents and sand blasting or shot blasting techniques conventionally used to produce clean metallic surfaces. The cements are formed by dissolving the indicated materials in inert solvents such as ethylene dichloride and toluene. By the term inert solvent is meant those solvents which neither enter into nor affect the chemical reaction between the reactive materials in the cements.

The time and temperature for curing the cement coatings as well as the elastomeric material can be varied within wide limitations. Elevated temperatures ranging from about 150° F. to 300° F. and times ranging from ½ hour to several hours may be employed. In general, higher curing temperatures permit the use of shorter curing times.

The active-hydrogen-containing polymeric material/ polyisocyanate mixture which, after cure, forms the desired elastomeric product may be applied to the cemented metallic base in the form of a liquid or in the form of a sheet of solid unvulcanized material depending upon the extent to which the polymeric material and the polyisocyanate have been reacted before they are applied to the metallic base. For example, when approximately 1.5 mols of a diisocyanate are reacted with 1.0 mol of a polyester for about 20 minutes at a temperature of 120° C., the reaction product is still a liquid suitable for casting which upon further heating sets or cures into a solid rubber-like polymer. In the preparation of these liquid, partially-reacted polymers, it is possible to use any polyisocyanate such as the di, tri, tetra, etc. isocyanates or any mixture of these materials. Alternatively, a solid uncured material can be prepared from the polyisocyanate/polymer mixture which can be applied to the cemented material in the form of a solid sheet and subsequently cured by the application of heat and pressure. These solid uncured materials, prepared as described in United States Patents 2,625,531; 2,625,532; and 2,625,535, are generally comparable to unvulcanized natural rubber, for instance, and can be processed on conventional rubber fabricating equipment such as mills and banburies where, if desired, other compounding ingredients, such as fillers, reinforcing agents, coloring pigments, and antioxidants, may be incorporated. To produce such uncured material part of the diisocyanate is withheld during the initial reaction. For example, approximately 0.95 mol of a diisocyanate per mol of polyester are reacted initially to an extent to produce a solid rubber-like uncured material. Later, after compounding ingredients, if any, have been incorporated, an additional amount of curative diisocyanate (about 0.5 to 0.6 mol per mol of polyester) is added to bring the total diisocyanate to approximately 1.5 mol per mol of polyester. Subsequent heating and, if required, application of pressure effects a cure of the uncured polymer and its adhesion to the cement-coated metal.

The mixtures of polyisocyanates employed in the first cement described above are those described in U. S. Patent 2,683,730. These mixtures are the polyisocyanates resulting from the phosgenation of the condensation product of aryl mono primary amines and aliphatic or aromatic aldehydes or ketones. By controlling the molecular ratio of amine to aldehyde or ketone in the range of from 4:2.5 to 4:3.5 with the amine being present in the larger molecular amount, a polyisocyanate mixture is produced by subsequent phosgenation in which the diisocyanate is present in the mixture in an amount not to exceed 40% by weight. These mixtures of polyisocyanates may be defined by the empirical formula:

$$OCN-R-(CY_2-R'-NCO)_n$$

in which R and R' are arylene radicals, Y is selected from the group consisting of hydrogen, alkyl and aryl radicals, n is a whole number and the (CY$_2$—R'—NCO) groups in excess of one are attached to the R radical. Preferred polyisocyanate mixtures for use in the first cement are those obtained by the phosgenation of the polyamines resulting from the condensation of aniline with formaldehyde, benzaldehyde, acetaldehyde, methyl ethyl ketone or acetone; ortho toluidine with formaldehyde, benzaldehyde, methyl ethyl ketone or acetone; ortho anisidine with formaldehyde, benzaldehyde, acetaldehyde, methyl ethyl ketone or acetone; and alpha naphthyl amine with formaldehyde, benzaldehyde, acetaldehyde, methyl ethyl ketone or acetone. It has been found that particularly good results are achieved when the polyisocyanate mixture obtained from the phosgenation of the aniline/formaldehyde condensation product is used. An inert solvent may be used in preparing the cement compositions. The weight ratio of solvent to solids in either of the cements employed in the practice of this invention may be varied over a wide range, with the desired consistency of the liquid cement determining, for any particular formulation, the amount of solvent required. Particularly good results have been obtained by employing in the first cement approximately 95% by weight of ethylene dichloride as the solvent and 5% by weight of the mixture of polyisocyanate and styrene/ acrylonitrile resin, and by employing in the second cement approximately equal parts by weight of toluene as the solvent and the styrene/acrylonitrile resin and polyol/diisocyanate reaction product.

The weight ratio of styrene/acrylonitrile resin to polyisocyanate in the first cement may be varied from about 3:7 to about 7:3, with best results being observed in cements containing approximately equal parts by weight of the resin and polyisocyanate.

While both of the above-described cements have reasonably good storage life, it is recommended that for best results they be used within one month of their preparation, after which time the cements tend to thicken, making their application to the metal in a smooth continous film difficult.

The styrene/acrylonitrile resin employed in both cements can be prepared from 50 to 80 parts by weight of styrene and from 50 to 20 parts by weight of acrylonitrile. A particularly effective styrene/acrylonitrile resin is that sold by Rohm and Haas Chemical Company under the name of "Plexene M" which product is believed to be a resin formed from the polymerization of approximately 70 parts by weight of styrene and 30 parts by weight of acrylonitrile.

The polyols that are used in the formation of the second coating cement of this invention are those liquid polyols that have a molecular weight from about 200 to about 1000, representative examples of which are polyethylene glycols, polypropylene glycols, polybutylene glycols and the like. These liquid polyols are reacted with about a 100% excess of a diisocyanate, usually one mol of polyol with about two mols of diisocyanate. Representative examples of the diisocyanates that may be used are hexamethylene; para-phenylene; meta-phenylene; 1,5-naphthalene; 4,4'-diphenylene; 4,4'-diphenylene methane; 3,3'-dimethyl 4,4'-diphenyl diisocyanates; the tolylene diisocyanates. The material preferred is the material that results from the reaction of 1 mol of polyethylene glycol having an average molecular weight of about 400 and 2 mols of tolylene diisocyanate. This material is commercially available from the Monsanto Chemical Company, St. Louis, Missouri, under the trade name "AT-10-50." Good results have been obtained when 10 parts by weight of this material have been used with 1 part by weight of styrene/acrylonitrile resin.

The practice of this invention is further illustrated by the following examples which are to be interpreted as representative rather than restrictive of the scope of this invention.

EXAMPLE 1

A steel metal base test plate was cleaned by sand blasting. Onto this bare metal surface was poured a liquid polyester-diisocyanate polymer. This liquid polymer was made by reacting (A) a polyester (1.0 mol) prepared by the condensation of adipic acid with a mixture of 20% propylene glycol and 80% ethylene glycol to a hydroxyl number of about 58.4 and a carboxyl number of about 1.6, with (B) 1,5-naphthalene diisocyanate (1.5 mols) for 20 minutes at 120° C. To this reaction mixture butanediol 1,4, (0.48 mol) was added. The complete reaction mixture was stirred for 1 minute and then poured or cast upon the metal plate. The coated plate was cured by heating at 210° F. for 16 hours and thereafter for 4 hours at 248° F.

EXAMPLE 2

A steel metal plate was prepared as in Example 1 and coated with a thin film of cement containing 95% by weight of ethylene dichloride solvent and 5% by weight of a mixture of equal parts of (A) a resin resulting from the polymerization of styrene and acrylonitrile and (B) a polyisocyanate resulting from the phosgenation of an aniline-formaldehyde condensation product. This polyisocyanate is a mixture of diisocyanates, triisocyanates, tetraisocyanates etc. and had an amine equivalent of 137 and an approximate average molecular weight of 280. This coating was allowed to dry and was cured for 4 hours at 210° F. A liquid polyester/diisocyanate polymer identical to the one described in Example 1 was cast onto this surface and cured as described in Example 1.

EXAMPLE 3

A steel metal test plate was cleaned as in Example 1 and was coated with a film of a cement containing 50% by weight of toluene and 50% by weight of a mixture of 1 part of the resin resulting from polymerization of styrene and acrylonitrile and 10 parts of the reaction products of 1 mol of polyethylene glycol of an average molecular weight of 400 and 2 mols of tolylene diisocyanate. This coating was cured for 16 hours at 210° F. and a polyester/diisocyanate mixture identical to the one described in Example 1 was cast onto this surface and cured as described in Example 1.

EXAMPLE 4

A steel metal test plate was treated in the same manner as was done in Example 3 except the cement contained 1 part of styrene/acrylonitrile resin and 3 parts of the reaction product of 1 mol of polyethylene glycol and 2 mols of tolylene diisocyanate. A polyester/diisocyanate mixture identical to that described in Example 1 was cast upon this surface and cured as described in Example 1.

EXAMPLE 5

A clean steel metal plate was coated with a film of cement as was described in Example 2 and cured as described in Example 2. Onto this surface was coated another film of a cement containing 50% by weight of toluene and 50% by weight of a mixture of 1 part of styrene/acrylonitrile resin and 1 part of the reaction product of 1 mol of polyethylene glycol of an average molecular weight of 400 and 2 mols of tolylene diisocyanate. This coating was cured 16 hours at 210° F. and an elastomer identical to the one described in Example 1 was cast onto this surface and cured as described in Example 1.

EXAMPLE 6

The procedure as described in Example 5 was followed except in the second cement the ratio of styrene/acrylonitrile resin to the reaction product of polyethylene glycol and tolylene diisocyanate was 1:3 instead of 1:1.

EXAMPLE 7

The procedure as described in Example 5 was followed except the ratio of styrene/acrylonitrile resin to the reaction product of polyethylene glycol and tolylene diisocyanate was 1:5 instead of 1:1.

EXAMPLE 8

The procedure described in Example 5 was followed except that the ratio of styrene/acrylonitrile resin to reaction product of polyethylene glycol and tolylene diisocyanate was 1:8 instead of 1:1.

EXAMPLE 9

The procedure described in Example 5 was followed except that the ratio of styrene/acrylonitrile resin to the reaction product of polyethylene glycol and tolylene diisocyanate was 1:10 instead of 1:1.

EXAMPLE 10

The procedure described in Example 5 was followed except that the ratio of styrene/acrylonitrile resin to the reaction product of polyethylene glycol and tolylene diisocyanate was 1:15 instead of 1:1.

EXAMPLE 11

The procedure described in Example 5 was followed except that the ratio of styrene/acrylonitrile resin to the reaction product of polyethylene glycol and tolylene diisocyanate was 1:20 instead of 1:1.

Adhesion values were determined for two test pieces prepared according to the methods described in Examples 1 through 11. These adhesion tests were conducted according to ASTM Method D–413–55, machine method. The results of these adhesion tests, representing the average of the two individual test pieces, are reported in the table below in pounds per inch width of test strip required to pull the elastomer from the metal base. The values reported under "Initial Adhesion" are those obtained on test pieces run at 77° F. The values reported under "Hot Adhesion" are those obtained from test pieces maintained at a temperature of 158° F. for at least 20 minutes and tested at 158° F. Where the test is reported as a "Failure" the adhesion of the elastomer to the metal was so slight that the force required to pull them apart was not measurable by the test machine. Where "100+" appears in the table, the force required to break the bond between the metal and the elastomer was above 100 pounds per inch which represented the limit of the test machine.

*Table*

| Example | Initial adhesion | Hot adhesion |
|---|---|---|
| 1 | 33 | 25 |
| 2 | 38 | 17 |
| 3 | 100+ | Failure |
| 4 | 100+ | Failure |
| 5 | 60 | 60 |
| 6 | 53 | 54 |
| 7 | 84 | 73 |
| 8 | 100 | 95 |
| 9 | 100+ | 100+ |
| 10 | 100+ | 100+ |
| 11 | 100+ | 100+ |

It will be apparent from the results reported in the table that the use of either of the cements individually (Examples 2, 3 and 4) provides very little improvement, particularly in the "Hot Adhesion," over Example 1 where no adhesive system was employed and where the elastomer was cast onto the bare uncemented metal. It is also apparent that when the two cements are combined (Examples 5 through 11) it is only when the ratio of styrene/acrylonitrile resin to the reaction product of the polyol and diisocyanate in the second cement is increased to 1:8 that substantial improvement in both "room temperature" and "hot" adhesion is obtained over the use of no adhesive as represented by Example 1.

It, therefore, becomes apparent that the advantages in "room temperature" and "hot" adhesion are obtained only when the combination of adhesives are employed as disclosed herein and, then, only when the ratio of reactants in the second adhesive are controlled within the limits recited.

While certain representative embodiments and details have been shown for the purpose of illustrating the invention, it will be apparent to those skilled in this art

We claim:

1. The process of adhering to metal an elastomeric reaction product of a polyisocyanate and at least one active-hydrogen-containing polymeric material having an average molecular weight of from approximately 1,000 to 5,000 and being selected from the group consisting of polyesters, polyesteramides and polyalkylene ether glycols which comprises applying to the surface of the metal (A) a first cement containing an inert solvent, a styrene/acrylonitrile resin, and a polyisocyanate mixture defined by the formula $$OCN-R-(CY_2-R'-NCO)_n$$

in which R and R' are arylene radicals, Y is selected from the group consisting of hydrogen, alkyl, and aryl radicals, n is a whole number, and the $$-(CY_2-R'-NCO)$$

groups in excess of one are attached to the R radical, the said mixture containing at most 40% of the diisocyanate, the weight ratio of said polyisocyanate mixture to said resin being from 3:7 to 7:3, curing said first cement and applying (B) a second cement containing an inert solvent, a styrene/acrylonitrile resin, and a reaction product of approximately 1 mol of a polyol having a molecular weight from about 200 to about 1000 and selected from the group consisting of polyethylene glycols, polypropylene glycols and polybutylene glycols and not more than 2 mols of a diisocyanate, the weight ratio of said resin to said reaction product being from 1:8 to 1:20, curing this second cement and applying (C) a layer of said elastomeric material, and curing said elastomeric material to said metal.

2. The process defined by claim 1 in which the reaction product in (B) is the reaction product of approximately 1 mol of polyethylene glycol having an average molecular weight of about 400, and not more than 2 mols of tolylene diisocyanate.

3. The process defined by claim 1 in which R and R' are phenylene radicals and Y is hydrogen.

4. The process defined by claim 2 in which R and R' are phenylene radicals and Y is hydrogen.

5. The process as defined by claim 4 in which in (A) the weight ratio of polyisocyanate mixture to resin is 1:1.

6. The process as defined by claim 5 in which in (B) the weight ratio of resin to reaction product is 1:10.

References Cited in the file of this patent
UNITED STATES PATENTS

| | | |
|---|---|---|
| 2,381,186 | Roquemore | Aug. 7, 1945 |
| 2,415,839 | Neal et al. | Feb. 18, 1947 |
| 2,436,222 | Neal et al. | Feb. 17, 1948 |
| 2,498,652 | Daly | Feb. 28, 1950 |